3,071,559
HEAT CURABLE EPOXY ETHER RESIN EMPLOYING META-CHLOR-ANILINE-FORMALDEHYDE HARDENER AND PROCESS OF CURING THE SAME
Carl Mayn Smith, St. Paul, Minn., assignor to General Aniline & Film Corporation, New York, N.Y., a corporation of Delaware
No Drawing. Filed July 7, 1958, Ser. No. 746,617
7 Claims. (Cl. 260—45.2)

This invention relates to polyglycidyl ethers of polyhydric alcohols, commonly and hereinafter referred to as

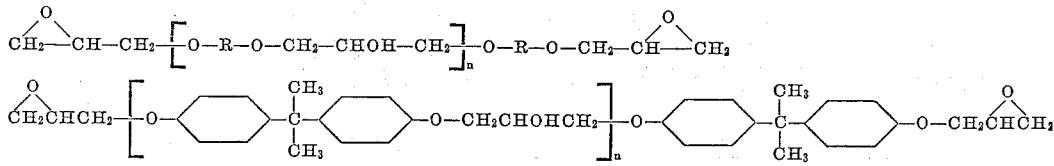

epoxy ether resins, and particularly to a new class of curing composition for said resins.

It is well known that epoxy ether resins are useful in the manufacture of varnishes, enamels, molding compositions, adhesives, films, fibers, molded articles, and the like. In order to cure or harden such epoxy ether resins and compositions containing them, various types of curing agents have been proposed such as alkalies, carboxylic acids and anhydrides, Friedel-Crafts metal halides, and particularly amines. From a practical commercial standpoint, the curing or hardening agents generally used are aliphatic polyamines or aromatic polyamines. The aliphatic polyamines suffer from the disadvantage in many applications of epoxy resins that the resulting hardening resin has a rather low heat distortion resistance and have the additional disadvantage that once mixed with the epoxy ether resin the pot life of the resulting mixture is extremely short. As a result, the aromatic polyamines, particularly meta-phenylenediamine have heretofore found the widest use as hardening agents for epoxy ether resins and yield cross-linked resins with somewhat higher heat distortion temperatures than the aliphatic polyamines, and also when initially mixed with the epoxy ether resin yield a composition with somewhat longer usable pot life. The aromatic polyamines are not, however, without certain disadvantages. In particular, they are inflammable and are also highly toxic so that considerable care must necessarily be employed in using them.

It has also been proposed in U.S. Patent 2,511,913 to Greenlee to employ certain condensates of aldehydes and aromatic amines such as aniline-formaldehyde condensates as hardening agents for epoxy ether resins. However, the aniline-formaldehyde condensates disclosed by Greenlee are prepared under conditions designed to give a maximum concentration of methylene-bis-aniline in the product, and according to the patent are preferably employed along with one of the more usual curing agents or hardeners such as aliphatic amines, alkali metal hydroxides, alkali phenoxides and boron trifluoride catalysts. I have found that the condensates of aniline-formaldehyde prepared as described in Greenlee Patent 2,511,913 which contain a high percentage of methylene-bis-aniline have limited utility as curing agents or hardeners for epoxy ether resins and when used by themselves result in a brittle resin such that test castings can readily be broken up in the hand.

I have now found that the solid resinous products obtained by condensing meta-chloraniline with formaldehyde in molar ratios of 1:0.5 to 1:0.9 and in the presence of a strong aqueous acid solution are particularly valuable as hardening or curing compositions for epoxy ether resins. These compositions have the advantage that they are relatively non-toxic and non-inflammable as compared with aromatic polyamines e.g. meta-phenylene-diamine, and when mixed with polyether resins yield a composition having an improved pot life and on curing produce a hardened resin having an improved heat distortion temperature.

These novel meta-chloraniline formaldehyde resinous products prepared in accordance with the present invention are particularly adaptable for the curing of epoxy ether resins characterized by the following general formulae:

wherein R represents the divalent hydrocarbon radical of the dihydric phenol and $n$ represents the extent of copolymerization as determined by the epoxy equivalent which ranges from 140 to 4000. By the epoxy equivalency is meant the average number of 1,2-epoxy groups

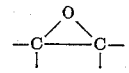

contained in the average molecule. It is expressed in the trade as the grams of the polymeric material or resin containing one gram equivalent of epoxide.

The liquid epoxy ethers are obtained by the procedures described in United States Patents 2,500,600; 2,633,458; 2,642,412; 2,324,483; 2,444,333; 2,520,145; 2,521,911 and 2,651,589; all of which are incorporated herein by reference for examples of the types of epoxy ether resins that may be employed for curing with our catalysts.

Of the several types epoxy ether resins with varying epoxide equivalents, we prefer to employ those having an epoxide equivalent ranging between 140 and 290, preferably between 190–210 because of its low melting point 8–12° C. (as determined by Durran's mercury method) and ease of formulation.

The novel resinous curing compositions of the present invention may be represented by the following general formula:

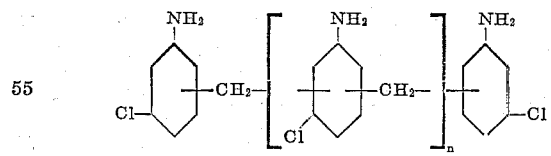

wherein $n$ represents an integer of from 1 to 6, and preferably from 2 to 4. They are readily prepared by heating an excess of meta-chloraniline with aqueous formaldehyde in the presence of an aqueous acid such as hydrochloric acid until the condensation is complete. Preferably a substantial amount of acid is used, since as shown by Example 1 below the use of a small amount of acid results in a product, one fraction of which is not satisfactory for hardening epoxy resins. It will be understood that the greater the molar excess of meta-chloraniline over formaldehyde, the lower is the molecular weight of the resulting resinous condensation product (fewer number of recuring units in the resin). I have found that products of the type noted above are obtained when the molar ratio of meta-chloraniline to formaldehyde is in the range of 1:0.5 to 1:0.9. Specific products of this type are disclosed in the following specific examples and the details of their preparation will be apparent to those skilled in the art from a consideration thereof.

EXAMPLE 1

A large excess of meta-chloraniline, 510 grams and 80 grams of 37% aqueous solution of a formaldehyde and 3 cc. of concentrated hydrochloric acid were heated for 24 hours to 80° C. The resulting reaction mixture was then vacuum distilled to yield a liquid fraction boiling at 85–90° C. at 1–2 mm. pressure; largely methylene-bis-chloro-aniline, and a polymeric residue.

Both the liquid fraction and the polymeric residue were stirred at room temperature into a liquid epoxy resin having an epoxide equivalent of 190–210 in the amounts indicated in Table I immediately below.

TABLE I

| G. liquid per 18.5 g. epoxy (828) | Curing temperature, ° C. | Properties |
|---|---|---|
| 2.5 | 6 hrs. at 85, 6 hrs. at 150 | Soft, brittle. |
| 4.0 | do | Brittle. |
| 5.5 | do | Very brittle. |
| 7.0 | do | Do. |
| G. polymer | | |
| 2.0 | do | Soft, sticky. |
| 4.0 | do | Hard. |
| 6.0 | do | Do. |
| 8.0 | do | Do. |
| | | Heat distortion temp., ° C.: |
| 7.0 | 16 hrs. at 30, 6 hrs. at 85 | 107. |
| 8.0 | do | 125. |
| 9.0 | do | 144. |
| 10.0 | do | 162 (preferred). |

The liquid fraction was unsatisfactory as a hardener, while the polymeric residue was found to be an effective hardener.

EXAMPLE 2

In a 1 l. flask, set on a steam bath and topped by a reflux condenser was charged 165 g. m-chloraniline
330 cc. 6 N HCl and
72 g. formalin 37%

The contents of the flask were thoroughly mixed by shaking and the whole heated for 24 hours. Some orange colored polymer, which formed when the formalin was added, gradually went into solution. The cooled homogeneous reaction solution was made basic with excess sodium hydroxide solution and the unchanged 3-chloraniline removed by steam distillation. The polymeric residue was a solid resinous product of sufficient hardness to be reduced to a fine powder on being pulverized in a Waring Blendor with cold water. After pulverization the powder was removed by filtration, washed neutral with cold water and dried under high vacuum (0.5–1.0 mm.).

The thus obtained powder was then mixed with a liquid epoxy resin having an epoxide equivalent of 190–210 by heating the epoxy ether resin to 85 to 90° C. and stirring in varying amounts of the hardener until all the added hardener were in solution. The thus obtained casting mixed hardener was poured into a Teflon mold and cured by heating in an oven for 6 hours at 85° C., followed by 6 hours at 150° C. The amount of hardener employed in these casting compositions as well as the heat distortion temperatures of the resulting casting are given in the Table II immediately below:

TABLE II

| Bar No. | G. hardener per 18.5 g. (828) | Heat distortion temperature, ° C. |
|---|---|---|
| 1 | 5.0 | 104 |
| 2 | 6.0 | 139 |
| 3 | 7.0 | 171 |
| 4 | 8.0 | 171 |
| 5 | 9.0 | 162 |
| 6 | 9.0 | 161 |
| 7 | 10.0 | 151 |
| 8 | 10.0 | 152 |

From consideration of the heat distortion temperatures in the above table, it will be noted that the use of 7 to 9 grams of the hardener per 18.5 grams of epoxy ether resin is preferred since castings having highest heat distortion temperatures and otherwise improved properties are obtained within this range.

EXAMPLE 3

A series of 3 resinous condensation products of meta-chloraniline and formaldehyde in molar ratios of meta-chloraniline to formaldehyde of 1:0.6, 1:0.7 and 1:0.8 were prepared as follows:

(A) *Condensation of 3-Chloraniline With Formaldehyde at 0.60 Mol Ratio Formaldehyde to Chloraniline*

In a 2 l. 4-necked flask set on a steam bath and fitted with thermometer, stirrer, reflux condenser and dropping funnel was charged 400 g. 3-chloraniline and
900 cc. 6 N HCl. The slurry of amine hydrochloride was heated and with stirring
153 g. formalin solution (37% wt.) was run in over 20 minutes. The temperature of the reaction mixture reached 102° (mild reflux) at the end of the addition of formalin and then dropped down to 97°. The flask temperature was held at 96–98° until the initially formed solid had re-dissolved. In order to neutralize excess acidity the warm solution was then run into a hot solution of
300 cc. 50% wt./wt. NaOH and
900 cc. distilled water, while agitating vigorously by passing in steam. Unchanged 3-chloraniline was removed by steam distillation and excess alkali taken out by vigorously boiling up the residual resin several times with fresh water by passing in steam until the wash water was neutral. The hot fluid resin was transferred to a resin pot and stripped of water in an oil bath at 150° and under 0.5 to 0.1 mm. vacuum.

Yield=372 g. brown transparent resin, tacky enough to be dented with the finger nail.

(B) *Condensation of m-Chloraniline With Formaldehyde at 0.70 Mol Ratio*

The procedure of A above was repeated except that the charge to the flask was 400 g. 3-chloraniline
900 cc. 6 N HCl and
178.5 g. formalin 37% wt./wt.

The resulting product was worked up as in A above.
Yield=400 g. brown transparent hard resin. Hard enough to be powdered but lumps together after standing several days.

(C) *Condensation of 3-Chloraniline With Formaldehyde at 0.80 Mol Ratio*

The procedure of A above was repeated except that the charge to the flask was 400 g. 3-chloraniline
200 cc. 6 N HCl and
204 g. formalin 37% wt./wt.

The resulting product was worked up the same as in A above.

Yield=416 g. brown transparent resin. Considerably harder than B. Powder stays unconsolidated longer, than B.

Bar castings were made by mixing each of the thus obtained resinous products with varying amounts of epoxy ether resins having an epoxide equivalent of 190–210 by heating the epoxy resin to 85 to 90° C. and stirring thereinto the amount of resinous hardener noted in the table below until all of the hardener had been dissolved. The thus obtained casting mix was then poured into Taflon bar molds and cured by heating in an oven for 12 hours at 85° C. followed by heating either for 6 hours at 150° C. or for 6 hours at 180° C. as noted in the table below. The amounts of resinous curing agent added to the epoxy ether resin and the heat distortion temperatures of the resulting castings are given in Table III immediately below.

TABLE III

| Sample | A | | B | | C | |
|---|---|---|---|---|---|---|
| Ratio CH₂O chloroaniline | 0.6 | | 0.7 | | 0.8 | |
| H.D.T.'s at Xg/18.5 g. Epon "828" [1][2] | Post cure, 150° C. | Post cure, 180° C. | Post cure, 150° C. | Post cure, 180° C. | Post cure, 150° C. | Post cure, 180° C. |
| 6.0 | 139 | 148 | 136 | 144 | 133 | 141 |
| 7.0 | [3]167 | [3]172 | [3]168 | [3]172 | [3]158 | [3]170 |
| 8.0 | [3]169 | [3]165 | [3]175 | [3]173 | [3]173 | [3]178 |
| 9.0 | [3]158 | [3]158 | [3]170 | [3]169 | [3]170 | [3]171 |
| 10.0 | 151 | 149 | [3]170 | [3]162 | [3]163 | [3]166 |
| 11.0 | 145 | 142 | 154 | 154 | [3]160 | [3]162 |

[1] Epon 828—a diglycidyl ether of para,para' isopropylidenediphenol having an average molecular weight of 350–400 and an epoxide equivalent of 175–210.
[2] Useful ranges.
[3] Preferred.

It was found that the product of C above though giving a somewhat higher heat distortion temperature was somewhat more difficult to warm up during this preparation and was more difficult to dissolve in the epoxy resin than were the products of A and B above. Hence the product of B above is a more preferred product and represents a product giving a good heat distortion temperature which is readily incorporated into the epoxy ether and can be obtained in good yield. The average molecular weight of this preferred product B was determined and found to be 469. On diazotization it showed a nitrite value of 1 primary amine group per polymer unit.

The three products of Example 3 were also compared with 1,3-phenylenediamine by mixing with epoxy ether resins having an epoxide equivalent of 190–210. It was found that the products A and B above when mixed with this epoxy ether resin and allowed to stand at room temperature for 40 hours poured readily on being warmed to 60° C. Also portions of these casting mixes after standing at room temperature for 24 hours was heated at 85 to 90° C. and then allowed to stand at room temperatures for 16 hours longer, poured readily on being warmed to 60° C. In contrast therewith, when 1,3-phenylenediamine was mixed with the same epoxy ether resin and the mixture allowed to stand for 24 hours at room temperature the mix had cured to a brittle solid and could not be poured on warming. After 40 hours at room temperature this brittle solid obtained when using 1,3-phenylenediamine could not be melted in the hot box at 85° C. but was a rubbery gel at that temperature. It was also found that products A, B and C above when mixed with an epoxy ether resin having an epoxide equivalent of 190–210 cured the resin considerably more completely at 85° C. than does 1,3-phenylenediamine under the same conditions. Disks cured with the above agents for 16 hours at 85° C. were not shattered by hammer blows considerably more violent than those which shattered a similar disk using 1,3-phenylenediamine. In addition it was found that when using the novel hardeners of this invention, that useful hardened resins were obtained over a much wider range of proportion of hardener to epoxy ether resin to be hardened than was the case with 1,3-phenylenediamine.

I claim:
1. A heat curing composition comprising a heat curable epoxy ether resin consisting of a diglycidyl ether of para,para' isopropylidenediphenol and having an epoxide equivalnt within the range of 140 to 290 in admixture with a curing amount of a hardener composition consisting essentially of solid resinous products of the formula

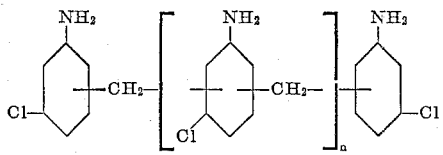

wherein $n$ is an integer in the range of 1 to 6 and obtained by condensing meta-chloraniline with formaldehyde in molar ratios of 1:0.5 to 1:0.9 under aqueous acid conditions.

2. The heat curing composition of claim 1 wherein the molar proportion of meta-chloraniline to formaldehyde in the hardener composition is within the range of 1:0.6 to 1:0.8, and wherein the diglycidyl ether of para,para' isopropylidenediphenol specified has an epoxide equivalent within the range of 175–210.

3. The heat curing composition of claim 1 wherein the molar proportion of meta-chloraniline formaldehyde in the hardener composition is about 1:0.7, and wherein the diglycidyl ether of para,para' isopropylidenediphenol specified has an exoxide equivalent within the range of 175–210.

4. The heat curing composition of claim 2 wherein from 7 to 9 parts by weight of the hardener composition are employed to 18.5 parts by weight of the epoxy ether resin, and wherein the diglycidyl ether of para,para' isopropylidenediphenol specified has an epoxide equivalent within the range of 175–210.

5. A process of hardening epoxy ether resins consisting of a diglycidyl ether of para,para' isopropylidenediphenol and having an epoxy equivalent within the range of 140 to 290 which comprises incorporating in such epoxy ether resin in a curing amount a hardener composition comprising the solid resinous condensation product of meta-chloraniline and formaldehyde in molar proportions of 1:0.5 to 1:0.9.

6. The process of claim 5 wherein the said hardener composition specified is the solid resinous condensation product of meta-chloraniline and formaldehyde in molar proportions 1:06 to 1:0.8, and wherein the diglycidyl ether of para,para' isopropylidenediphenol specified has an epoxide equivalent within the range of 175–210.

7. The process of claim 5 wherein the said hardener composition specified comprises condensation product of meta-chloraniline and formaldehyde in molar proportions of about 1:0.7, and wherein the diglycidyl ether of para,para' isopropylidenediphenol specified has an epoxide equivalent within the range of 175–210.

References Cited in the file of this patent
UNITED STATES PATENTS
2,511,913 Greenlee _____ June 20, 1950
2,881,149 Neut et al. _____ Apr. 7, 1959

OTHER REFERENCES
Ogata: J. Am. Chem. Soc., 73, page 1715 to 1717 (1915).